June 25, 1963

R. D. McLAUCHLAN 3,095,055

AUTOMATIC FILLING AND WEIGHING DEVICE FOR
SUCCESSIVE CONTAINERS

Filed Aug. 7, 1961

INVENTOR.
ROBERT D. McLAUCHLAN
BY
ATTORNEY

June 25, 1963

R. D. McLAUCHLAN 3,095,055

AUTOMATIC FILLING AND WEIGHING DEVICE FOR
SUCCESSIVE CONTAINERS

Filed Aug. 7, 1961

INVENTOR.
ROBERT D. McLAUCHLAN
BY
F.R. Geisler.
ATTORNEY

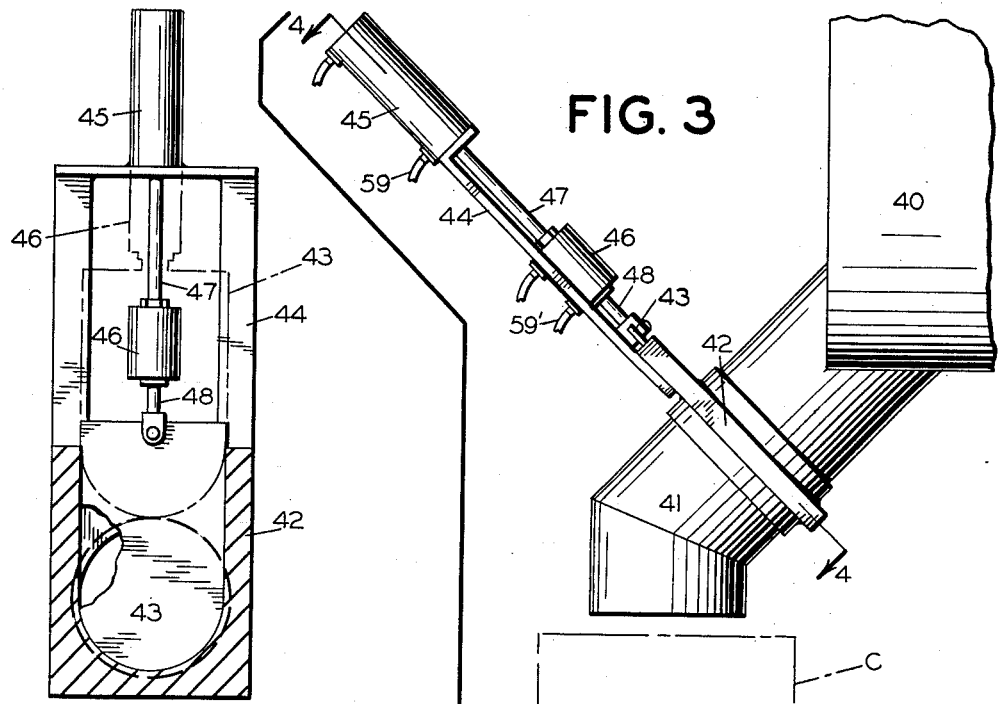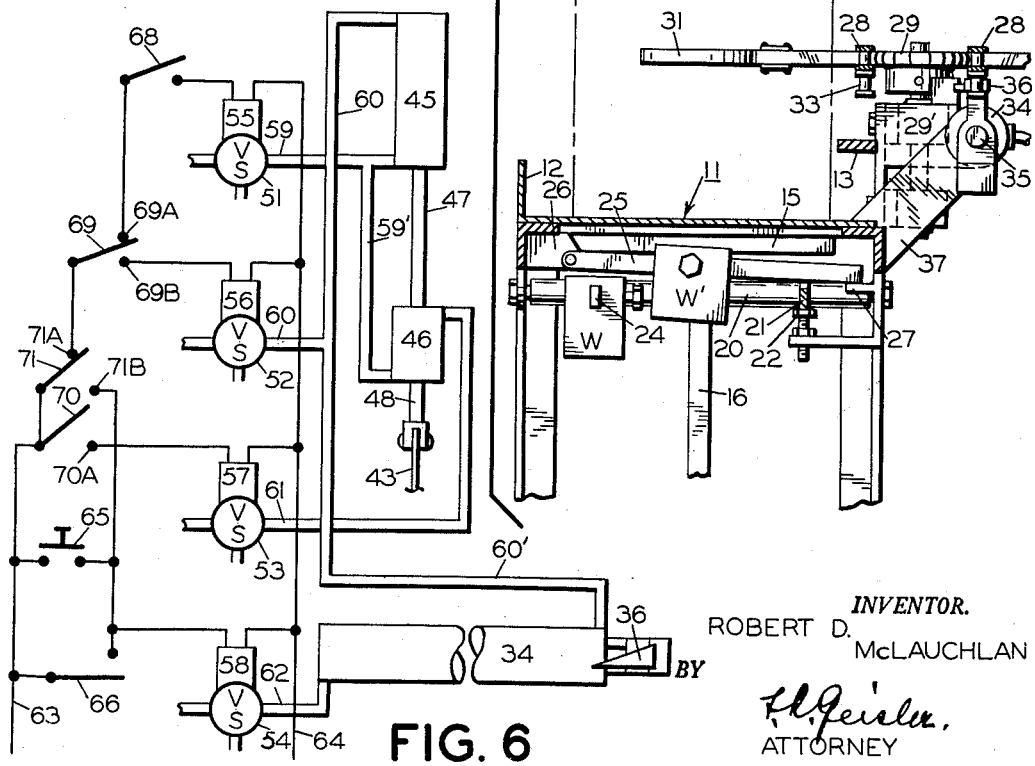

United States Patent Office 3,095,055
Patented June 25, 1963

3,095,055
AUTOMATIC FILLING AND WEIGHING DEVICE FOR SUCCESSIVE CONTAINERS
Robert D. McLauchlan, Salem, Oreg., assignor to A. B. McLauchlan Co. Inc., Salem, Oreg., a corporation of Oregon
Filed Aug. 7, 1961, Ser. No. 129,742
3 Claims. (Cl. 177—53)

This invention relates in general to means for automatically dispensing material from a supply tank or the like into a series of receptacles or containers in such a manner that only a desired predetermined amount will be deposited in each receptacle or container in turn.

More specifically, the invention relates to the dispensing of flowable material from a tank into a series of containers which are moved successively into receiving position and then filled with an exact amount of the flowable material automatically and without any wasting or spilling of the material.

In particular, the device of the present invention has been developed for the purpose of automatically filling large cans with food products, such as strawberries, either whole or sliced, mixed with sugar and including the juice from the berries, preparatory to canning, packaging, and/or freezing the mixture, but, while the device will accordingly be described as employed for the dispensing of this special food product, it is to be understood that the device is not limited to use with any particular product or material since, as will be apparent, it is equally suitable for use with many materials.

An object of the invention is to provide an improved automatic filling device for a series of identical containers which will operate automatically to move each container in turn into position for receiving material dispensed from the discharge spout of a supply source, and then move each container away from such receiving position when the container has received a predetermined desired amount of the material being dispensed.

A related object of the invention is to provide an automatic device for dispensing flowable material into a plurality of containers in succession so arranged as to cause each container to be filled up to the point at which the weight of the material dispensed into the container has reached a predetermined amount, and then to cause the filling of the next successive container immediately to take place.

Another object of the invention is to provide a filling and weighing assembly for a series of containers which will include an automatic control for the dispensing spout or channel from a supply tank or the like in order that the material being dispensed will be allowed to pass out from the dispensing spout or channel only during such time as a container is in position to receive the material being dispensed.

A further object is to provide an automatic control, in a filling and weighing assembly, for the dispensing spout or channel of the supply tank, which will automatically momentarily cause such dispensing spout or channel to be shut off as soon as a desired predetermined amount has been deposited in a container, and then cause the dispensing spout or channel to be reopened as soon as the next container to be filled is in position to receive material from the dispensing spout or channel, thereby preventing any spilling or wasting of the material.

An additional object is to provide an improved control for a dispensing spout from a material supply tank in a filling assembly which will automatically cause the rate of discharge from the spout to be reduced as the amount of the material being dispensed into a single container approaches the predetermined desired amount, and thereby enable more accurate control of the dispensing of the material to take place during each filling operation.

A still further object is to provide an improved automatic filling and weighing device for a series of containers which will be simple and practical in construction and which will not involve any difficult maintenance problems.

These objects and other advantages I have been able to achieve with the improved dispensing assembly hereinafter briefly described, in which the flow from the discharging spout of the supply tank and the moving of the empty containers successively into and out of receiving position are automatically controlled in accordance with the setting of the device for the amount of material desired in each container.

In the following description reference is made to the accompanying drawings wherein:

FIG. 3 is a fragmentary sectional elevation taken on line 3—3 of FIG. 2 and showing also, in side elevation, the dispensing spout of the supply tank with the flow control means mounted thereon;

FIG. 4 is a section taken longitudinally through the flow control means of the dispensing spout, and thus taken on line 4—4 of FIG. 3, the control gate valve in the flow control means being shown in full lines in fully closed position and its fully open position being indicated by broken lines;

FIG. 6 is a diagram showing the electrical and compressed air control operating lines.

Figure 1:
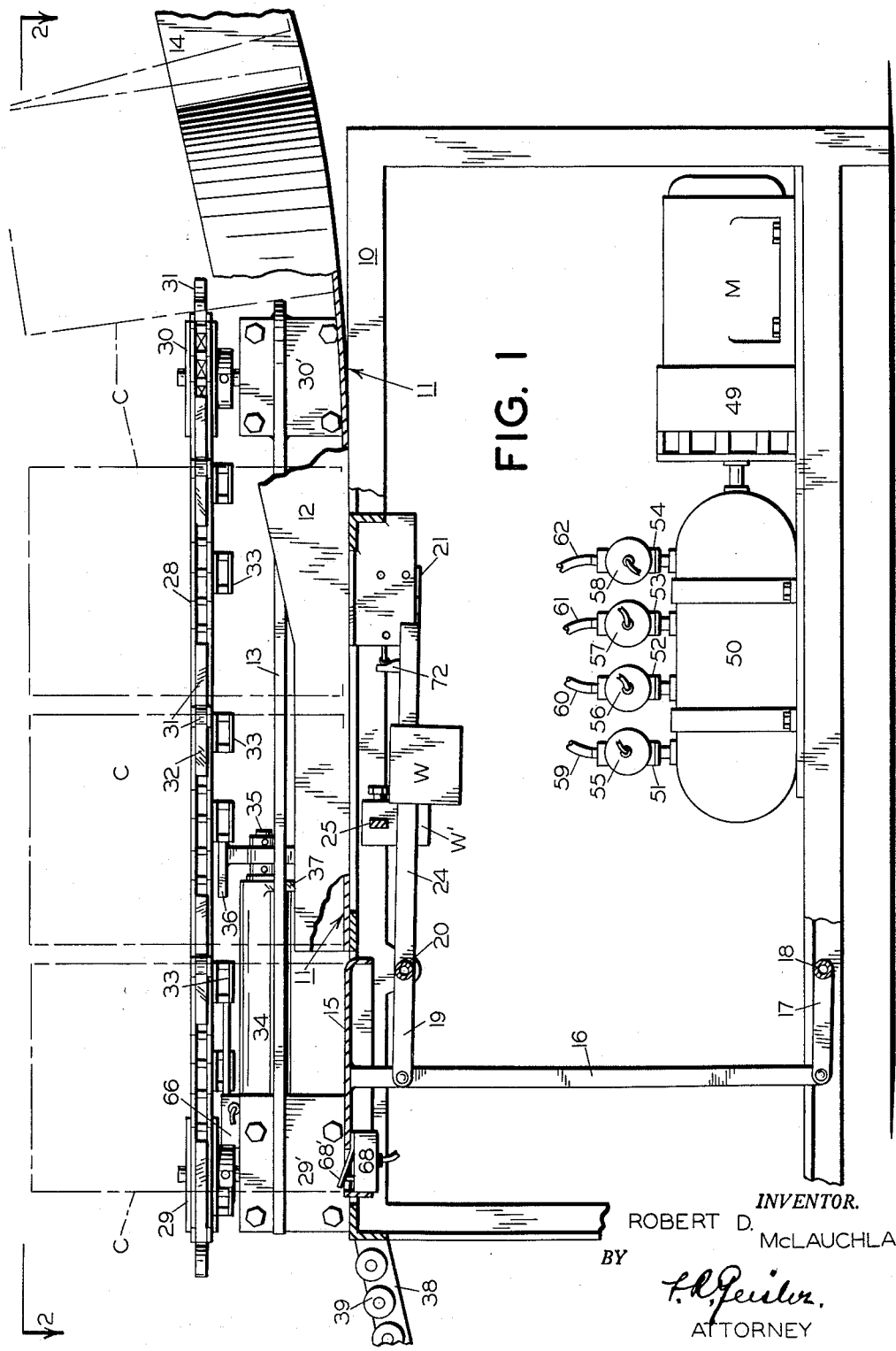
FIG. 1 is a partial front elevation of the device, with portions broken away and shown in section, showing the means for moving the containers into position successively and showing parts of the operating control.
Figure 2:
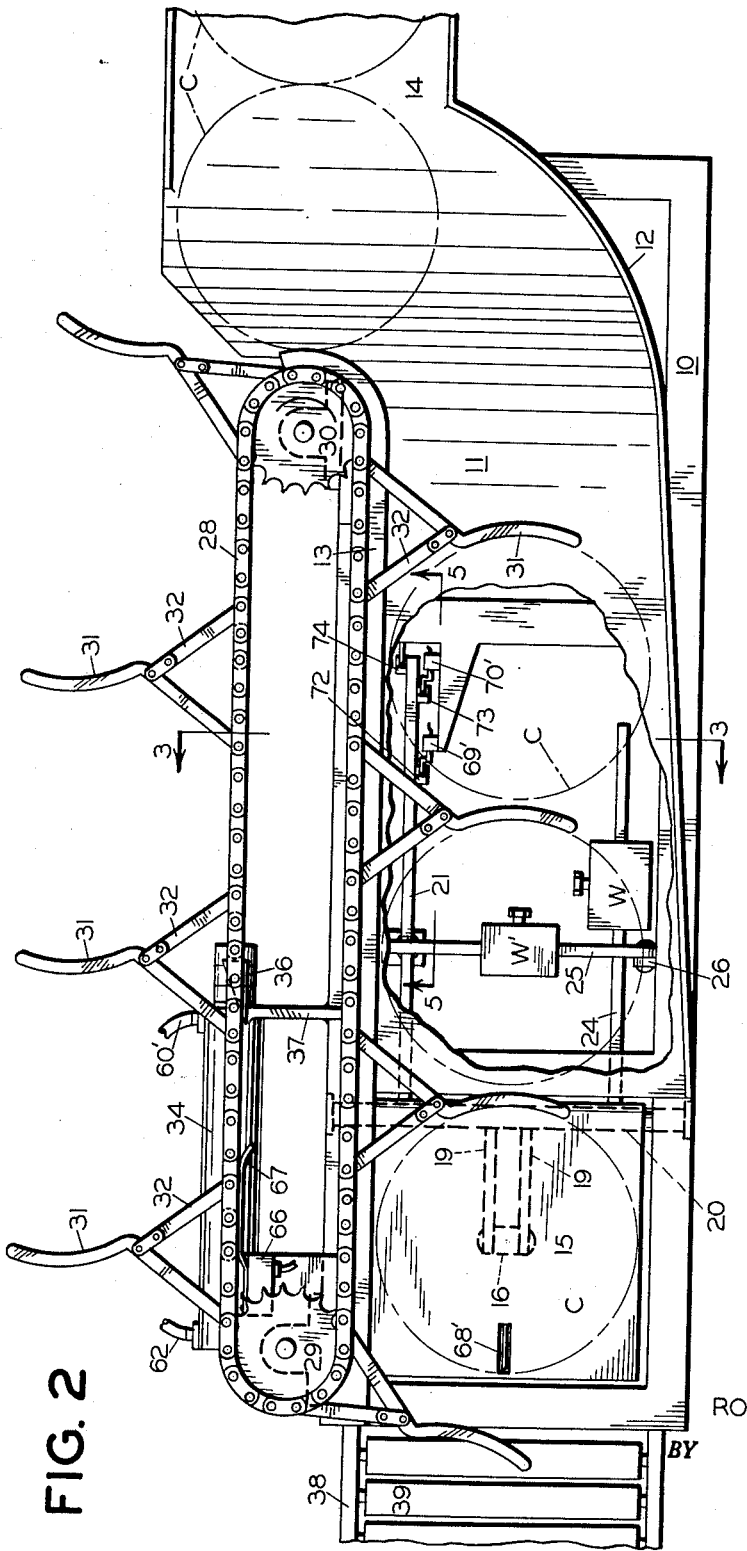
FIG. 2 is a horizontal section taken on line 2—2 of FIG. 1.
Figure 5:
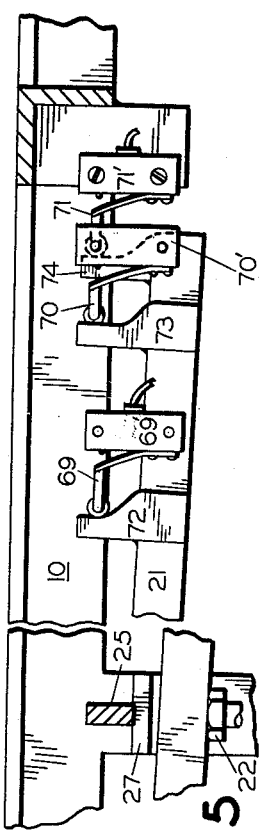
FIG. 5 is a fragmentary and foreshortened sectional elevation on line 5—5 of FIG. 2 drawn to a larger scale.

Referring first to FIGS. 1 and 2, the container moving and control means, and the power supply means, are supported on a suitable frame indicated in general by the reference character 10. A guideway 11 for the moving containers is supported on top of the frame 10 and this guideway includes a bottom plate, on which the containers slide, with an outer guide wall 12 and an inner guide rail 13 to keep the moving containers in line. In FIGS. 1 and 2 the containers are indicated by the broken lines C, the containers being all identical and preferably, although not necessarily, cylindrical, with their outside diameters somewhat less than the width of the guideway. An inclined chute, the end portion of which is shown at 14, leads down to and merges with the guideway 11 so that the empty containers are delivered by gravity to the guideway where they are engaged individually by travelling arms presently described.

The guideway 11 leads to a weighing control plate 15 on which each container in turn rests during the filling of the container. This weighing control plate 15 is secured to the top of a center leg 16 which leg is mounted for limited up and down movement by means of parallel hinged arms, including a pair of bottom arms, one of which is shown at 17 in FIG. 1, and which are secured on a horizontal rotatably mounted shaft 18, and an identical upper pair of arms 19 secured on a horizontal rotatably mounted shaft 20. Rotation of the upper shaft 20, and therewith the up and down movement of the weighing plate 15, is restricted by a switch control arm 21 which is rigidly mounted on the shaft 20. The upward swing of this arm 21 is restricted upon engagement with a cross arm 25, described later, and the downward swing of arm 21 is restricted by an adjustable stop 22 (FIG. 3). The outer end of the switch arm 21 carries a plurality of switch operating members later described.

A first weight-carrying scale arm 24 (FIGS. 1, 2 and 3) is also rigidly mounted on the shaft 20 and carries a slidable weight W. A second weight-carrying arm 25 extends transversely across the main frame 10 spaced beneath the guideway 11 and normally spaced above the first weight-carrying arm 24. This second weight-carrying arm 25 has one end pivotally mounted on a bracket 26 secured on the main frame, and the opposite free end of this arm 25 normally rests on a stop 27 secured to the opposite side of the main frame. This second weight-carrying arm 25 similarly carries a slidable weight W', which, however, is lighter in weight than the weight W on the arm 24.

The arrangement of the two weight-carrying arms 24 and 25 and of the control arm 21 is such that when the weight of the container and its contents on the weighing plate 15 is sufficient to overbalance the weight W on the first weight-carrying arm 24 the arms 24 and 21 will be raised upwardly until the arm 24 engages the second weight-carrying arm 25. Then further upward swing of the arm 24 (and therewith upward swing of the control arm 21) will be temporarily halted until the weight of the container and its contents, and thus the weight of the additional material placed in the container, is increased sufficiently to cause the first weight-carrying arm 24 also to raise the second weight-carrying arm 25. Thus a double-acting scale is in effect provided by the arms 24 and 25 and their adjustable weights W and W', and the double-acting scale causes the switch control arm 21 to move upwardly to a first position when the weight of the container and the material received into the container has reached a point close to the desired weight, and then to move up to a second and final position when this predetermined desired weight is actually attained.

An endless sprocket chain 28 (FIGS. 1, 2 and 3) is supported in a horizontal plane by a pair of sprocket wheels 29 and 30 located at opposite ends of the chain course respectively and having their vertical shafts mounted in suitable supports 29' and 30' on the main frame 10. Can engaging and moving arms 31 (shown best in FIG. 2) are mounted on the outside of the chain 28, extending in the same horizontal plane with the chain, and are held in proper extending position by links 32, the arms 31 and links 32 having hinged connections with the chain 28 to allow for the curving path of the chain around the end sprocket wheels. The arms 31 are spaced apart a distance slightly greater than the diameter of the cans C so that each arm will engage a successive can as the cans reach the bottom of the chute 14 at the start of the guideway 11.

A series of equally-spaced lugs 33 (FIG. 1) are carried on the bottom side of the chain 28 and are spaced to correspond with the spacing of the can engaging arms 31. A double-acting air cylinder 34, located beneath the outer course of the chain 28, operates a piston and piston rod 35 and is so positioned as to enable an element 36 on the piston rod to engage each lug 33 successively of the chain 28.

As shown best in FIG. 2, the lug-engaging portion of the element 36 is wedge shape in the form of a right angle triangle and so arranged that the front flat edge will engage a chain lug so as to move the engaged lug from left to right (as viewed in FIG. 2) and cause travel of the chain 28 with the outward stroke of the piston and piston rod 35; but during the reverse movement or return stroke of the piston and piston rod the sloping edge of the element 36 will slide past the next succeeding lug and thus not cause any movement of the chain in the reverse direction. In this way the chain 28, and with it the can moving arms 31, are moved intermittently by the operation of the double-acting air cylinder 32, the arrangement being such that the full stroke of the piston and piston rod will be equal to the distance each can is to be moved successively as it travels from the end of the guideway 11 onto the weighing plate 15. When a filled can is moved off the weighing plate 15 and replaced by the next can, the filled can passes onto a slideway 38 provided with a series of freely rotating rollers 39. The double-acting air cylinder 34 is secured in horizontal position supported on a frame bracket 37. The means by which the actuation of the cylinder 34 is controlled will be explained later.

In the upper portion of FIG. 3 is shown an end of the supply tank 40 from which the material (thus the mixture of strawberries, sugar and juice, as an example) is to be dispensed into the cans or containers. The tank 40 has a discharging spout 41 which is so positioned as to discharge into a can C, or other suitable container, when positioned on the weighing plate 15. A gate valve housing 42 (FIGS. 3 and 4) is mounted on the spout 41, extending in a plane perpendicular to the axis of that portion of the spout. The gate valve housing 42 is provided with the usual gate valve guideway in which the gate valve 43 is slidable, the spout 41 being slit to allow passage of the gate valve. The bottom edge of the gate valve is semi-circular to conform to the curvature of the lower half of the spout 41 when the gate valve is entirely closed. Gate valves of this general type are well-known and thus the valve itself need not be described in detail.

A frame 44 extends up from the housing 42 for the gate valve and in parallelism with the housing, being rigidly supported on the housing. A first double-acting gate-operating air cylinder 45 is secured on the top of the frame 44. A second double-acting cylinder 46 is secured on the end of the piston rod 47 of the air piston in the cylinder 45. The gate valve 43 is connected to the end of the piston rod 48 of the piston in the second air cylinder 46. As will be apparent, the arrangement of these cylinders is such that the upward stroke of the pistons in both cylinders will cause the gate valve to be fully opened, the downward stroke of the piston in the first cylinder 45 will cause the gate valve to be closed most of the way, but not entirely closed, and the subsequent downward stroke of the piston in the second cylinder 46 will complete the closing of the gate valve. The reason for this particular arrangement will be apparent later.

A motor M (FIG. 1) drives an air compressor 49 which delivers air into a compressed air storage tank 50. The motor M is controlled by automatic control means (not shown) which enables a supply of air at desired predetermined pressure to be maintained in the air tank 50 whenever the device is operating. Such automatic control means for a motor and air compressor is old and well-known, and, since it forms no part of the present claimed invention, it need not be described. The air storage tank 50 is provided with four outlet ports and the passage of air through these ports is controlled by four double-acting valves 51, 52, 53 and 54. Each of these valves is normally held in closed exhaust position by spring means (not shown) and when in such position each valve prevents the passage of air from the air tank 50 through the valve and permits air to exhaust from the air line on the opposite side of the valve. Operating solenoids 55, 56, 57 and 58 are provided for the valves 51, 52, 53 and 54 respectively and when these solenoids are activated the respective valves are moved to permit passage of compressed air into the respective air lines with which they are connected and to shut off the exhaust from such air lines.

Referring now to the diagram in FIG. 6, the two main conductor lines, leading from a suitable source of electric power, are indicated at 63 and 64. The electrical connections leading to the motor M are not shown, but it is to be understood that there is a manually operated main control switch for the motor M. Furthermore, as previously mentioned, when the motor is connected to the power line, the operation of the motor is then governed by the air pressure control connected with the air compressor and compressed air tank, such control being conventional equipment.

When the operation of the filling of the cans or other containers is to start the empty cans are placed in succession on the guideway 11 (FIG. 2) in position between the arms 31. The first can to be filled will then be adjacent to the weighing plate 15 before the chain 28 and arms 31 begin to move. The piston rod of the cylinder 34, and therewith the chain-engaging element 36, will be in the retracted position shown in FIGS. 1 and 2. With the motor M and air compressor operating sufficiently to supply the necessary compressed air to air tank 50, the operator closes a starting switch 65 (FIG. 6) and holds this switch closed manually for a moment until the first can has been moved into position on the weighing plate 15. The temporary closing of this starting switch 65 activates solenoid 58 which operates the valve 54 and causes compressed air to pass through the air line 62 to the cylinder 34. This moves the piston and piston rod and the chain-engaging element 36 (to the right, as viewed in FIGS. 2 and 6) and results in the moving of the first can into position on the weighing plate 15. When the first can is in position on the weighing plate 15 the operator releases the starting switch 65 and the device then starts functioning automatically.

A switch 68 (FIGS. 1 and 6) is mounted on the underside of the weighing plate 15 in the location shown in FIG. 1, and a spring-controlled actuating element 68' for this switch extends up through a slot in the plate 15. The moving of an empty can into position on the plate 15 causes the actuating element 68' to be pressed down so as to close the switch 68. The closing of this switch causes activation of solenoid 55 which opens air control valve 51. Compressed air now passes through the air line 59 to the bottom of the main cylinder 45 for the gate valve in the tank spout 41 and also through the branch line 59' to the bottom of the second cylinder 46 for the gate valve. As a result, the gate valve in the spout is fully opened and the delivery of material into the empty can on the weighing plate 15 begins.

Assuming, for example, that it is desired to have exactly thirty pounds of material delivered into each can or container, the weight W on the first weight-carrying arm 24 is so positioned that this arm will be raised when the weight of material in the can being filled reaches twenty-eight pounds. The raising of the arm 24, and therewith the raising of the control switch arm 21, to the first raised position causes a cam member 72 on the arm 21 to move a spring-controlled switch arm 69 of a double-acting switch 69' so as to disengage a contact 69A and close a contact 69B. The closing of the contact 69B with the switch arm 69 activates the solenoid 56 for the air control valve 52 (FIG. 6). This causes compressed air to pass through the air line 60 to the top of cylinder 45 which operates to close the gate valve 43 of the spout 41 most, but not all, of the way and reduces the rate of discharge through the spout 41. At the same time air passes through the branch air line 60' into cylinder 34 and moves the piston, and piston rod, and chain-engaging element 36 back to retracted position.

The filling of the can on the weighing plate 15 now continues more slowly, since the gate valve is only partly open, as additional material is delivered into the can being filled. When the weight of the additional material causes the first weight arm 24 to raise the second weight arm 25 then the switch control arm 21 is simultaneously raised to a second position. The raising of the control switch arm 21 to this second position causes a cam member 73 on the arm 21 to move a spring-controlled switch arm 70 of a switch 70' into closed position to close off contact 70A. This closes the circuit to solenoid 57, causing the air valve 53 to open and compressed air to pass through the air line 61 to the top of the second gate valve operating cylinder 46, with the result that the gate valve is now completely closed in the spout 41. At the same time the raising of the switch control arm 21 to this second position causes a cam member 74 on the arm 21 to move a spring-controlled switch arm 71 of a double-acting switch 71' so as to disengage a contact 71A and close a contact 71B. The closing of the contact 71B actuates the solenoid 58 for air valve 54 causing air to pass again into cylinder 34 to move the piston rod outwardly thus producing movement of the chain 28 and can-moving arms 31 and the moving of the filled can from the weighing plate 15.

When the filled can is moved part way off of the weighing plate 15 it would be possible for the weighing plate 15 to start moving upwardly, under the influence of the weights W and W', before the filled can has entirely left the plate 15. If this occurred it would cause the spring-controlled switch arm 71 to open the contact 71B which would immediately cause the air to be shut off through the air line 62, and if this happened before the piston rod 35 and chain-engaging element 36 had moved out for the full stroke of the piston, the filled can might not be moved entirely off of the plate 15 and the next empty can moved entirely into proper filling position. To prevent such a possibility a time delay switch 66 is mounted adjacent the chain 28 in the location shown in FIG. 2. A spring element 67, which operates the switch 66, is so arranged as to be engaged by each lug 33 carried on the underside of the chain 28. The spring element 67 holds the switch 66 closed whenever the spring element 67 is not being engaged by a lug 33 on the chain 28. The positioning and arrangement are such that this spring element 67 will become disengaged and thus close the switch 66 when the chain is moving but will be engaged by a lug 33 when the piston rod, chain-engaging element and chain have moved the desired distance, and will remain engaged, thus holding the switch 66 open, as long as the chain remains stationary. In this way any possibility of a filled can not being moved entirely off the weighing plate 15 is avoided.

Thus the device is capable of operating continuously and entirely automatically as long as the supply of empty containers and the supply of material for filling such containers in succession last. Since no material can pass out through the discharging spout of the supply tank except when a container is properly positioned beneath the spout, and since the discharging of the material from the spout is shut off before the container leaves its filling position, there is no problem of any spilling or wasting of the material. Furthermore, since the rate of discharge through the delivery spout is slowed down as the amount of material delivered into a container approaches the desired predetermined limit, then, with the final automatic shutting-off of all flow through the spout, there will be only an insignificant amount of material still on its way to the container. The result is that the amount of material delivered into the container is held very closely to the exact predetermined desired amount.

Several modifications would of course be possible in the construction and arrangement of parts of this device without departing from the scope of the invention. However the device, constructed as illustrated and described, has proved very satisfactory in performance and consequently, the device so constructed is regarded as the preferred means for the carrying out of this invention.

I claim:

1. In an automatic dispensing and weighing device of the character described, a weighing plate, a supply receptacle having a discharge spout positioned above said weighing plate, a gate valve in said spout, means for operating said gate valve, said means including a first double-acting air cylinder, a stationary support for said cylinder mounted on said spout, a second double-acting air cylinder carried on the piston rod of said first air cylinder, said gate valve connected to the piston rod of said second air cylinder, said cylinders so arranged that the movement of the piston rod of said first cylinder to fully extended position while the piston rod of said second cylinder remains in retracted position will move said gate valve into nearly closed position, whereupon the subsequent movement of the piston rod of said second cylinder into extended position will complete the closing of said gate valve, and whereby the retraction of the piston rods of both cylinders simultaneously will move said gate valve into fully opened position, an air pressure line connected to both of said cylinders for moving both piston rods into retracted position, a control valve in said air pressure line, electrically operated means for opening said latter mentioned valve, a switch element in said latter mentioned means located on said weighing plate and so arranged that the moving of a container into receiving position on said weighing plate will contact said switch element and cause said latter mentioned valve to be opened and result in said gate valve in said spout being moved to fully opened position, a second air pressure line connected to said first cylinder for moving said first cylinder piston rod into fully extended position, electrically operated means controlling the passage of air under pressure into said second air pressure line, a second switch element for said last mentioned electrically operated means, an adjustable balance assembly connected with said weighing plate, said second switch element connected with said balance assembly and so arranged as to be momentarily actuated when the load on said weighing plate has nearly reached a predetermined amount, the actuation of said second switch element causing air under pressure to pass into said second air pressure line and causing the circuit through said first switch element to be interrupted, a third air pressure line connected to said second cylinder for moving said second cylinder piston rod into extended position, and a third switch element in said balance assembly so arranged as to be actuated momentarily when the load on said weighing plate reaches said desired predetermined amount.

2. The combination set forth in claim 1 with the addition of intermittently operating means for moving containers successively on to and off of said weighing plate, an air cylinder having a piston rod operating said last mentioned means, a fourth air pressure line connected to said last mentioned cylinder, an electrically operated control valve for said fourth air pressure line, and a fourth switch element in said balance assembly actuated simultaneously with said third switch element for operating said control valve for said fourth air pressure line momentarily to cause a container to be moved off of said weighing plate when the load on said weighing plate has reached said desired predetermined amount.

3. The combination set forth in claim 1 with the addition of intermittently operating means for moving containers successively on to and off of said weighing plate, an air cylinder having a piston rod operating said last mentioned means, a fourth air pressure line connected to said last mentioned cylinder, an electrically operated control valve for said fourth air pressure line, a fourth switch element in said balance assembly actuated simultaneously with said third switch element for operating said control valve for said fourth air pressure line, and additional circuit holding means for said electrically operated control valve for said fourth air pressure line for continuing the delivery of air under pressure to said last mentioned cylinder long enough to insure the moving of a filled container entirely off of said weighing plate.

References Cited in the file of this patent

UNITED STATES PATENTS

| | | |
|---|---|---|
| 924,191 | Scales | June 8, 1909 |
| 1,192,852 | Bruton | Aug. 1, 1916 |
| 1,327,644 | Taylor | Jan. 13, 1920 |
| 2,374,430 | Hexter | Apr. 24, 1945 |
| 2,613,905 | Muskat | Oct. 14, 1952 |